United States Patent Office 2,969,658
Patented Jan. 31, 1961

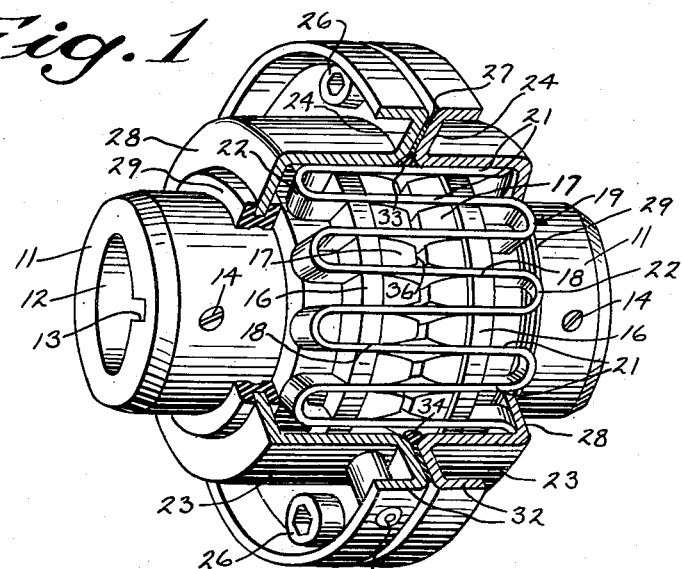
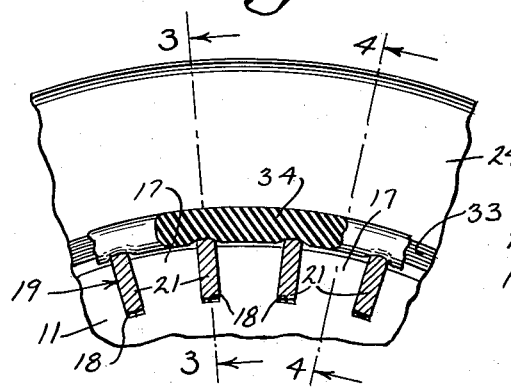
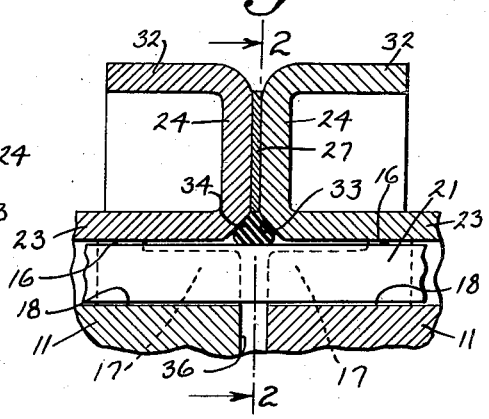
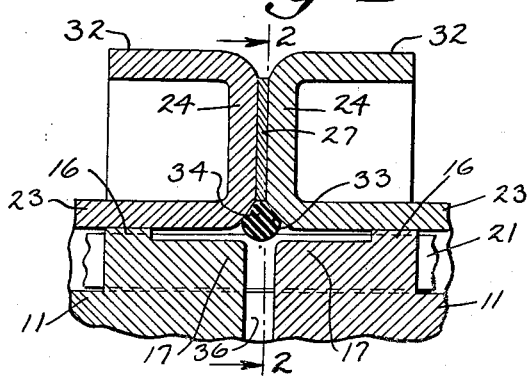
INVENTOR
EDWARD J. WELLAUER
ATTORNEY

2,969,658
COUPLING COVER

Edward J. Wellauer, Wauwatosa, Wis., assignor to The Falk Corporation, Milwaukee, Wis., a corporation of Wisconsin Filed July 24, 1959, Ser. No. 829,313

4 Claims. (Cl. 64—15)

This invention relates to flexible shaft-couplings in which the coupling members are formed with axially directed peripheral grooves, and are operatively connected together in driving relation by resilient interconnecting members fitting in and drivingly connected with said grooves of both coupling members.

The coupling members are known to the trade as "hubs"; and the resilient interconnecting members are known to the trade as "grids."

The invention is equally applicable to couplings having continuous zig-zag grids (such for example as, but not limited to, grids as shown and described in Wellauer Patent No. 2,885,871), and to couplings having a succession of separate grid elements (such for example as, but not limited to, grids as shown and described in Wellauer Patent No. 2,555,909). Grids of either of the above sorts may preferably be strips in ribbon form made from flat spring metal stock, or for example may consist of a plurality of superimposed layers of spring wire stock. Other resilient material than steel may be employed.

The grid and the adjoining ends of the two hubs are customarily enclosed in a housing, known to the trade as the "cover," which is packed with oil or grease, and is slidingly sealed to the two hubs so as to permit relative rotation and some relative axial movement, and yet prevent the escape of the lubricant.

One of the features of couplings of the general type on which the present invention is designed to improve, is that the two hubs are usually identical, and that the cover is usually formed of two identical complementary members, each such member having an outwardly radially projecting connecting flange secured to the corresponding connecting flange of the other such member. This symmetry is very important, as it greatly reduces the cost of manufacture and the stocking of replacement parts.

Another of the features of couplings of this general type is that the grid and the cover are both "free floating" with respect to the two hubs. This spreads any misalignment equally between the two halves of the coupling and thus produces maximal compensation with minimal distortion.

But the type of cover above described is possessed of considerable angular inertia. As a result of this, the angular velocity of the cover lags behind that of the hubs when the shafts are speeding up, and exceeds that of the hubs when the shafts are slowing down, and is opposite to that of the hubs when the direction of rotation of the shafts has been reversed. This causes wear of the sealing means, and eventually the escape of lubricant from the cover, as is especially serious in machinery which is subject to frequent reversing, or even merely frequent speed-change.

In the past, various unsatisfactory expedients have been employed to eliminate the above-mentioned inertia effects.

For example, the cover has been made in a single piece, bolted to one of the hubs. But this has not only been more expensive, but also has eliminated the above mentioned advantages of symmetry and free floating.

Employing a two-member cover, with one of the members secured to one of the hubs is open to the same objections.

Another expedient has been to longitudinally slidably pin one of the halves of the cover to the corresponding one of the hubs. But although this permits free floating of a sort, it adds expense and does not have the advantages of symmetry, and in addition the pins have sheared on occasion.

Accordingly it is the object of the present invention to provide means for damping the inertia effects, which means shall be simple and inexpensive, and shall preserve all the advantages of symmetry and free floating.

In the description, reference is made to the accompanying drawings, forming a part hereof, in which there is shown, by way of illustration and not of limitation, a certain specific form in which the present invention may be embodied.

In the drawings:

Fig. 1 is a view in perspective of a coupling embodying the present invention, with parts cut away.

Fig. 2 is a transverse section of a part of the cover of the same, seen as cut along the line 2—2 of Figs. 3 and 4.

Fig. 3 is a radial longitudinal section of the same part of the cover, seen as cut along the line 3—3 of Fig. 2.

Fig. 4 is another such radial longitudinal section, seen as cut along the line 4—4 of Fig. 2.

Figs. 2, 3, and 4, are to a more open scale than Fig. 1.

Throughout the drawings, the same reference numeral is applied to the same member, or to similar members.

Referring now to the drawings, and more particularly to Fig. 1, the numeral 11 designates each of two coupling elements, either of which can be the driver or the driven. Each coupling element has an axial hole 12 for the insertion of one of the two shafts (not shown) to be coupled together.

Means for drivingly connecting each coupling element to its respective shaft may consist in any well-known conventional means, such as a key (not shown) fitting in a keyway 13 in the hollow interior of the coupling element and a corresponding keyway in the shaft, and a setscrew 14 to secure the key.

Each coupling element 11 is provided with a series of circumferentially spaced radially projecting teeth at that face of the coupling element which faces the other coupling element. The base 16 of each tooth projects further radially than the point 17, for reasons which will appear later herein. Successive teeth form between them a series of axially directed peripheral grooves 18, the teeth being so shaped that these grooves flare at the face of the coupling element. The teeth are preferably equally spaced, and by the same token so are the grooves 18.

Lying in the grooves of both coupling elements, and interlacing the teeth thereof, there is a resilient grid 19, comprising torque transmitting limbs 21 and connecting end portions 22. Although as shown herein this grid is continuous, yet as stated earlier herein this is not essential. Furthermore the limbs and end pieces may be of flat spring metal, or of several pieces of spring wire side by side, or any other suitable resilient material.

The grid and the adjoining ends of the two coupling members are enclosed in a lubricant retaining cover formed of two complementary housing members 23, each having an outwardly radially projecting connecting flange 24, releasably secured to the corresponding connecting flange 24 of the other in any appropriate manner, as by bolts 26. There should preferably be a gasket 27 of any appropriate gasket material such as cork and neoprene, inserted between the two connecting flanges 24.

Each housing member 23 also has at its outer end an inwardly radially projecting sealing flange 28 which carries at its inner edge appropriate means for slidably sealing the cover to the cylindrical surface of its respective coupling element 11. This sealing means may preferably be a flexible sealing ring 29 such as shown and described in Schmitter Patent No. 2,181,537.

Lubricant can be injected into the cover through appropriate grease fittings 31 of a well-known type conveniently extending through the walls of housing members 23.

Each connecting flange 24 should preferably terminate in a cylindrical portion 32. This serves to protect bolts 26 and fittings 31; also to stiffen connecting flanges 24; and also avoids danger from what would otherwise be a rapidly rotating narrow edge.

It will be noted that on the inside of the cover there is formed by the juncture of connecting flanges 24 an annular groove 33 of wedge shaped cross section. It will also be noted that there is an annular ring 34 preferably of normally circular cross section, surrounding the limbs 21 of grid 19, and lying partly in annular groove 33. This ring is made of flexible resilient yieldable material such as latex rubber, or some synthetic substitute for latex rubber, preferably neoprene. Such rings are well known to mechanics as "O-rings" and serve various purposes in the mechanical arts, but never before have O-rings been employed for the purpose which they serve in the present invention.

Mention has been made hereinbefore of the fact that the point 17 of each tooth projects less far radially outwardly than does the base 16 of the tooth. Accordingly (see Figs. 3 and 4), due to this fact, and assisted by the gap 36 between adjacent faces of the two coupling elements 11, the center of each grid limb 21 (which is where the limb crosses annular groove 33 which partly contains ring 34) extends radially outwardly beyond the adjacent teeth, and contacts and indents ring 34 (see Fig. 2), forcing said ring into said annular groove 33 to be gripped thereby.

Thus annular groove 33 of wedge shaped cross section constitutes ring gripping means carried by the inside of the cover; and the radially outwardly extending center of each grid limb 21 constitutes cooperating ring gripping means carried by the coupling. These two ring gripping means grip ring 34 between them to constitute ring 34 to be means yieldably drivingly connecting the coupling to its cover. Accordingly, without shock, the cover conforms to the direction of rotation and angular velocity of the coupling, thereby eliminating the wear on sealing rings 29 which would otherwise result from the angular inertia of the cover when the angular velocity of the coupling is accelerated, retarded, or reversed, and yet without sacrificing the advantages (discussed near the beginning of this present specification) of having the cover be free floating and constructed of two identical parts.

It would be hard to imagine a simpler and less expensive means for accomplishing these desired ends.

It will be readily evident from the foregoing description that this invention affords an improvement over the prior art flexible couplings of this general type.

Now that one embodiment of the invention has been shown and described, it is to be understood that the invention is not to be limited to the specific form or arrangement of parts herein shown and described.

What is claimed is:

1. A flexible shaft-coupling, comprising: a pair of substantially coaxial coupling elements capable of limited relative rotation about their common axis, each such element being provided adjacent the face facing the other with a series of circumferentially spaced radially projecting driving teeth, which teeth define between them a series of axially directed peripheral grooves; means for drivingly securing these coupling elements to the ends of their respective shafts; a grid interlacing the teeth of both coupling elements, and thereby drivingly connecting said coupling elements; said grid comprising a series of torque transmitting resilient limbs, each lying in a groove of each coupling element; a lubricant retaining cover enclosing the grid and the adjoining ends of the two coupling elements, said cover being formed of two complementary housing members, each having an outwardly radially projecting connecting flange secured to the corresponding connecting flange of the other, the connecting flanges thus forming at their juncture on the inside of the cover an annular groove of wedge shaped cross section, each housing member also having means slidably sealing the outer end of each housing member to the surface of its respective coupling element; characterized by the fact that there is a ring of flexible resilient yieldable material lying partly in the annular groove; and that the outer edge of each limb extends radially outwardly beyond the adjacent teeth where such limb crosses said groove, each limb contacting and indenting said ring, and forcing said ring into said groove to be gripped thereby; whereby said ring constitutes means yieldably drivingly connecting the coupling to its cover for damping the angular inertia of the cover when the angular velocity of the coupling is accelerated, retarded, or reversed.

2. A flexible shaft-coupling according to claim 1, further characterized by the fact that the ring of flexible resilient yieldable material is of substantially circular cross section.

3. A flexible shaft-coupling, comprising: a pair of substantially coaxial coupling elements capable of limited relative rotation about their common axis, each such element being provided adjacent the face facing the other with a series of circumferentially spaced radially projecting driving teeth, which teeth define between them a series of axially directed peripheral grooves; means for drivingly securing these coupling elements to the ends of their respective shafts; and a grid interlacing the teeth of both coupling elements, and thereby drivingly connecting said coupling elements, said grid comprising a series of torque transmitting resilient limbs, each lying in a groove of each coupling element; said coupling having a lubricant retaining cover enclosing the adjoining ends of the coupling elements, said cover having means slidably sealing each end thereof to the surface of the adjacent coupling element; characterized by the fact that there is a ring of flexible resilient yieldable material gripped between ring gripping means carried by the inside of the cover and the outer peripheral portions of said torque transmitting resilient limbs to constitute the ring means yieldably drivingly connecting the coupling to its cover for damping the angular inertia of the cover when the angular velocity of the coupling is accelerated, retarded, or reversed.

4. In a flexible shaft-coupling comprising a pair of substantially coaxial coupling elements interconnected in driving relation by torque transmitting members enclosed in a lubricant retaining cover, the combination with said shaft-coupling of a ring of flexible yieldable material gripped between the inner surface of said cover and outer peripheral portions of said torque transmitting members, the ring thereby yieldably drivingly connecting the coupling to its cover for dampening the angular inertia of the cover when the angular velocity of the coupling is accelerated, retarded, or reversed.

References Cited in the file of this patent

UNITED STATES PATENTS

| | | |
|---|---|---|
| 2,027,842 | Schmitter et al. | Jan. 14, 1936 |
| 2,555,909 | Wellauer | June 5, 1951 |
| 2,859,600 | Wrightson et al. | Nov. 11, 1958 |
| 2,885,871 | Wellauer | May 12, 1959 |